Figure 1:
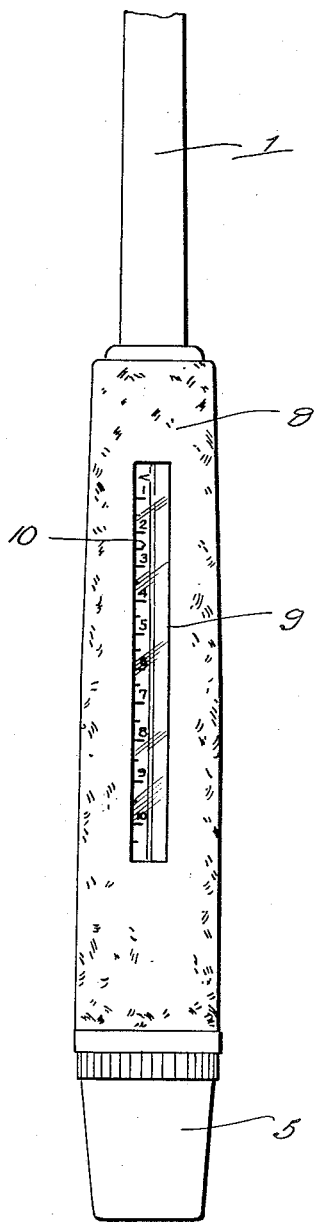

March 11, 1930.  T. T. REYNOLDS  1,750,193

FISH WEIGHING SCALE FOR FISHING RODS

Filed June 8, 1928

Inventor

*T. T. Reynolds*

By *Clarence A. O'Brien*
Attorney

Patented Mar. 11, 1930

1,750,193

UNITED STATES PATENT OFFICE

TERRY T. REYNOLDS, OF NORTH UVALDE, TEXAS

FISH-WEIGHING SCALE FOR FISHING RODS

Application filed June 8, 1928. Serial No. 283,959.

The present invention pertains to new and useful improvements in scale attachments for fishing rods and relates more particularly to a specially constructed fishing rod handle provided with a window and a tensioned member within the handle equipped with a hook at one end and provided with certain indicating means visible through the window, so that by suspending a fish or in fact any object from the hooked end of the tensioned member, the weight of the same can be easily determined.

An important object of the invention is to provide scale means for fishing rods wherein the handle portion of the fishing rod is constructed to entirely enclose a weighing scale unit, during the use of the same for fishing and which is quickly accessible, whereby fish or other objects may be quickly weighed.

A further object is to provide a fishing rod handle wherein a weighing scale unit may be permanently located without any inconvenience while fishing or in any manner impairing the utility of the rod.

After reading the following specification and claim, other important objects and advantages of the invention will readily become apparent.

Figure 2:
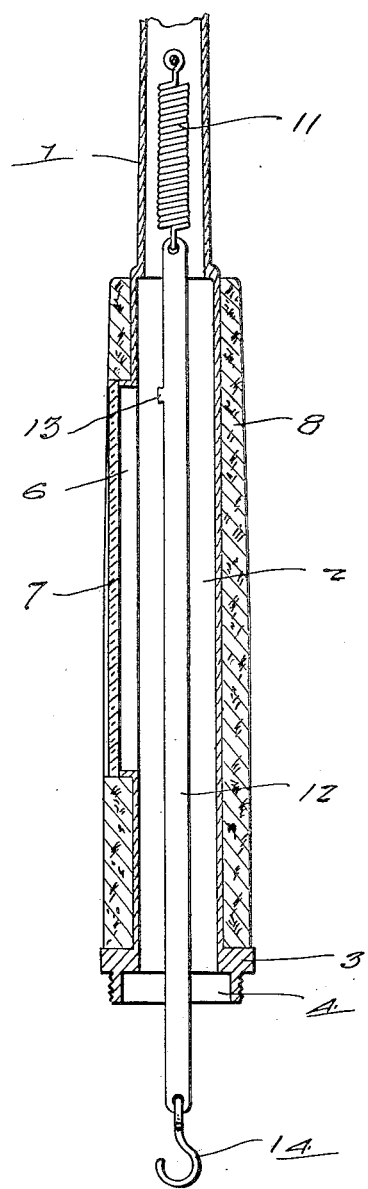

In the drawings:

Figure 1 represents a side elevation of a fragmentary portion of a fishing rod, with its handle portion constructed in a novel manner, to accommodate a weighing scale unit, and Figure 2 is a longitudinal sectional view of a fragmentary portion of the fishing rod, showing the weighing scale unit arranged within the hollow handle with its hooked end depending through the open butt end thereof.

Referring more particularly to the drawings, wherein like numerals designate like parts, the handle section 1 of the fishing rod is enlarged for a substantial distance inwardly from its butt end to provide a scale chamber 2. The butt end of the section 1 is provided with a circumferential flange 3, having an annular externally threaded extension 4, adapted to receive an internally threaded and knurled cap 5.

An elongated slit is formed for a substantial distance along the wall of the scale chamber 2 and this slot is provided with the flange 6, at the edges thereof, to provide a frame for receiving a strip of transparent material 7, such as glass or the like, and preferably being of relatively stauch material capable of not being easily broken. A sleeve 8 of cork or similar material is arranged over the enlarged butt end portion of the rod 1, to provide a hand grip.

This sleeve is formed with an elongated opening 9 in registry with the glass strip 7 so that the interior of the handle portion may be visible therethrough. The glass strip 7 is provided with suitable scale markings 10, complementary to the weighing scale unit feature of this invention to be described hereinafter.

A coiled expansible spring 11 is secured at one end to the inner side of the rod section 1, at a point inwardly from the butt end thereof. An elongated bar 12 is secured at its inner end to the opposite end of the spring and is provided at a point adjacent thereto with a laterally projecting pointer 13, which is visible through the glass 7 directly under the scale markings 10 when the bar 12 is properly arranged within the chamber 2. The bar 12 is of a length sufficient to permit its opposite end to project a slight distance beyond the open end of the rod section 1 and is provided at this end with a pivotal hook member 14.

In using the present device, the cap 5 is removed from the threaded annular extension 4, thus permitting the pivotal hook 14 to swing downwardly as the rod is disposed in a vertical position.

By attaching the object to be weighed to the pivotal hook 14, the weight thereof may be ascertained by looking through the transparent strip 7, at the position of the pointer 13, in respect to the scale marking 10 on the surface thereof.

Having described the invention, what is claimed as new is:

A fishing rod handle construction for containing indicating means, a tube provided with a slot extending longitudinally, a flange extending from the tube at the perimeter of said opening, a pane of transparent material adapted to cover said opening, and a sleeve of suitable hand grip material arranged on said tube and provided with a longitudinal opening therein for snugly receiving the flange of said tube.

In testimony whereof I affix my signature.

TERRY T. REYNOLDS.